US 9,805,226 B2

(12) United States Patent
Trusch et al.

(10) Patent No.: US 9,805,226 B2
(45) Date of Patent: Oct. 31, 2017

(54) METHOD FOR STARTING UP ELECTRIC OR ELECTRONIC DEVICES, START-UP APPARATUS, SERVER AND SYSTEM

(75) Inventors: Heiko Trusch, Wedel (DE); Tim Fuss, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 258 days.

(21) Appl. No.: 14/124,581

(22) PCT Filed: Jun. 8, 2012

(86) PCT No.: PCT/EP2012/060894
§ 371 (c)(1),
(2), (4) Date: Dec. 6, 2013

(87) PCT Pub. No.: WO2012/168429
PCT Pub. Date: Dec. 13, 2012

(65) Prior Publication Data
US 2014/0097942 A1    Apr. 10, 2014

Related U.S. Application Data

(60) Provisional application No. 61/495,454, filed on Jun. 10, 2011.

(30) Foreign Application Priority Data

Jun. 10, 2011    (DE) .......................... 10 2011 077 360

(51) Int. Cl.
*G06K 7/10* (2006.01)
*G06Q 10/06* (2012.01)
(Continued)

(52) U.S. Cl.
CPC ................ *G06K 7/10* (2013.01); *B64D 11/06* (2013.01); *B64D 11/0624* (2014.12);
(Continued)

(58) Field of Classification Search
CPC ................ B64D 11/06; B64D 11/0624; G05B 19/41805; G05B 19/4183; G06K 7/10;
(Continued)

(56) References Cited

U.S. PATENT DOCUMENTS 6,414,871 B1 * 7/2002 Wirtz, II ............ G06F 17/5054
365/185.01
6,929,218 B1 * 8/2005 Sanford et al. ............ 244/118.5
(Continued)

FOREIGN PATENT DOCUMENTS

DE            3428104       2/1986
DE       102004025319      12/2005
(Continued)

OTHER PUBLICATIONS

International Search Report, Oct. 15, 2012.
(Continued)

*Primary Examiner* — Quan-Zhen Wang
*Assistant Examiner* — Stephen Burgdorf
(74) *Attorney, Agent, or Firm* — Greer, Burns & Crain, Ltd.

(57) ABSTRACT

A method for starting up electric or electronic devices, in particular devices in or for an aircraft or spacecraft, including: supplying at least one location identification which contains at least one piece of information about the location of a respective device; detecting a supplied location identification for one device in each case; transmitting the detected location identification to the respective device; and parameterizing the respective device by means of the transmitted location identification. The present invention also provides a start-up apparatus, a server system and a system.

12 Claims, 2 Drawing Sheets

(51) Int. Cl.
*B64D 11/06* (2006.01)
*G05B 19/418* (2006.01)

(52) U.S. Cl.
CPC ... *G05B 19/4183* (2013.01); *G05B 19/41805* (2013.01); *G06Q 10/06* (2013.01); *G05B 2219/25062* (2013.01)

(58) Field of Classification Search
CPC ......... G06K 19/06; G06K 2017/00451; G06Q 10/06; G06Q 10/08; G06Q 10/0833; G06Q 10/087; G06Q 10/0875; G06Q 10/20; H04L 41/12; H04L 67/08; H04L 67/18; H04Q 9/00; H04Q 2209/40; H04Q 2213/00; H04W 4/02; H04W 8/26; H04W 60/00; H04W 64/00; H04W 76/02
USPC ...................... 340/10.1, 10.52, 10.31, 10.51; 455/456.1, 456.3; 709/217, 224
See application file for complete search history.

(56) References Cited

U.S. PATENT DOCUMENTS

| | | | |
|---|---|---|---|
| 7,860,516 B2* | 12/2010 | Hodges ................... H04W 8/22 | 455/456.1 |
| 8,271,234 B1* | 9/2012 | Cunningham et al. ....... | 702/188 |
| 8,325,023 B2* | 12/2012 | Kohlmeier-Beckmann et al. ........................ | 340/286.06 |
| 8,528,861 B2* | 9/2013 | Kneller et al. .............. | 244/118.6 |
| 8,602,307 B2* | 12/2013 | Marchesi .................. | 235/462.01 |
| 2002/0059211 A1 | 5/2002 | Kuramochi | |
| 2003/0001775 A1 | 1/2003 | Turner | |
| 2003/0158795 A1 | 8/2003 | Markham et al. | |
| 2003/0179714 A1* | 9/2003 | Gilgenbach ............ H04B 3/546 | 370/252 |
| 2004/0039497 A1* | 2/2004 | Wood et al. ........................ | 701/4 |
| 2005/0240377 A1* | 10/2005 | Bibelhausen et al. ......... | 702/188 |
| 2006/0032979 A1* | 2/2006 | Mitchell et al. ........... | 244/118.6 |
| 2006/0109811 A1* | 5/2006 | Schotten ................... G01S 1/68 | 370/328 |
| 2006/0186714 A1* | 8/2006 | Terno et al. ................ | 297/217.3 |
| 2006/0246892 A1* | 11/2006 | vonDoenhoff ........ H04W 28/16 | 455/427 |
| 2007/0189549 A1* | 8/2007 | Scheel .................... H04R 27/00 | 381/86 |
| 2007/0230420 A1* | 10/2007 | Bumiller ............... H04W 48/18 | 370/338 |
| 2008/0084306 A1* | 4/2008 | Durtschi et al. ........... | 340/572.1 |
| 2009/0189784 A1* | 7/2009 | Lindgren ............... G01B 15/06 | 340/945 |
| 2009/0212915 A1 | 8/2009 | Ulrich | |
| 2010/0035613 A1* | 2/2010 | Schroter .......... H04M 1/72572 | 455/435.1 |
| 2010/0060050 A1* | 3/2010 | Muirhead .......... B64D 11/0015 | 297/217.4 |
| 2011/0031896 A1* | 2/2011 | Vandevoorde et al. ...... | 315/294 |
| 2011/0117902 A1* | 5/2011 | Chang .................... H04W 4/02 | 455/418 |

FOREIGN PATENT DOCUMENTS

| | | |
|---|---|---|
| WO | 2009029594 | 3/2009 |
| WO | 2010092152 | 8/2010 |

OTHER PUBLICATIONS

German Office Action, Apr. 4, 2012.
Chinese Office Action, dated Mar. 2, 2016, from related Chinese Patent Application No. 2012800285151.
Chinese Office Action, dated Aug. 16, 2016, from related Chinese Patent Application No. 2012800285151.
European Patent Office Action, dated, Sep. 16, 2016, from related EPO Patent Application No. 12726795.3-1958.
J Polk, et al., "Network Working Group Dynamic Host configuration Protocol Option for Coordinate-based Location Configuration Information Appendix Calcualtions of Imprecision possible with the DHC LCI", Jan. 1, 2004, XP055301159, Cited in EPO Office Action.

* cited by examiner

METHOD FOR STARTING UP ELECTRIC OR ELECTRONIC DEVICES, START-UP APPARATUS, SERVER AND SYSTEM

CROSS-REFERENCES TO RELATED APPLICATIONS

This application claims benefit from and priority to the U.S. Provisional Application No. 61/495,454, filed Jun. 10, 2011, the German patent application No. 10 2011 077 360.6, filed Jun. 10, 2011, and the International Patent Application No. PCT/EP2012/060894, filed Jun. 8, 2012, the entire disclosures of which are incorporated herein by way of reference.

FIELD OF THE INVENTION

The present invention relates to a method for starting up electric or electronic devices, in particular devices in an aircraft or spacecraft. The present invention also relates to a start-up apparatus, a server and a system.

DE 10 2004 025319 A1 discloses an option for starting up devices by means of an ID chip.

BACKGROUND OF THE INVENTION

Although the present invention and the problem on which it is based can in principle be applied to any vehicles, they will be described in detail below with reference to an aircraft.

Modern aircraft comprise a plurality of electronic devices. These devices are conventionally connected to a central server via wired or wireless data interfaces. This server is designed to evaluate the data of these devices and to control the devices. For this purpose, the devices, which are connected to one another and to the one server via a data bus or via a wireless data interface, must be clearly identifiable by the server. In particular for electronic devices, which are present in large numbers in an aircraft, it is very important to have an efficient method for this purpose. These devices may for example be sensors. For example, seat occupancy sensors, which are installed at each seat, detect whether or not a passenger is sitting on a seat. Another example of such sensors are position sensors for seat backrests or the tables of the individual seats.

To control the sensors, these can be connected to the associated server, for example via a corresponding connection cable. Each sensor is thus clearly identifiable for the server by means of a connection port which is allocated to this sensor and to which the respective cable is connected. Modern wide-body passenger aircraft now accommodate well over 350 passengers. Therefore, aircraft of this type also comprise, for example, a number of seat occupancy sensors and position sensors which corresponds to the number of seats. It is clear that an above-described point-to-point connection of the plurality of sensors to the server using corresponding connection lines requires a very complex, large cable form, which, in addition to the additional material and assembly costs, would also significantly increase the weight. For these reasons, sensors which communicate with the server via a wireless interface or a data bus may be used in this context.

However, in order for sensors of this type to be clearly identifiable for the server, these are each provided with a sensor-specific identifier, known as a Function Item Number (FIN), which clearly identifies the individual sensors and also denotes the location or seat number thereof.

For example, a FIN is allocated to the individual sensors using what is known as PIN coding. In PIN coding, sensors are parameterised by means of suitable jumpers or address selection switches. In this context, each jumper or each address selection switch represents one bit of a binary code. The FIN of the respective sensor is then set in the respective sensor as a binary code by means of the jumpers or address selection switches. The selection switches may alternatively also represent a digit of a decimal code, hexadecimal code, etc.

When using PIN coding, a technician must first read off the identification numbers of a plurality of electric devices individually and set them manually by means of the jumpers or address selection switches. This identification number is conventionally printed on a sticker which is placed at the location of the device. In modern wide-body aircraft in particular, this proves very time-consuming. This is also error-prone owing to the large number of devices to be parameterised, especially since, with the progressive miniaturisation of individual devices, the jumpers or address selection switches are also becoming smaller and thus more difficult to operate manually.

SUMMARY OF THE INVENTION

Against this background, one idea of the present invention is to provide, in particular in an aircraft or spacecraft, simplified start-up of devices to be parameterised.

Accordingly, the following are provided:

A method for starting up electric or electronic devices, in particular devices in or for an aircraft or spacecraft, comprising the following steps: supplying at least one location identification which contains at least one piece of information about the location of a respective device; detecting a supplied location identification for one device in each case; transmitting the detected location identification to the respective device and parameterising the respective device by means of the transmitted location identification.

A start-up apparatus for electric or electronic devices, in particular for devices in or for an aircraft or spacecraft, for carrying out a method according to the invention, comprising: a first data interface which is designed to read in a location identification and/or to read in a device identification of a device; a second data interface which is designed to communicate with at least one device; a control means which is designed to parameterise a device via the second data interface by means of the read-in location identification and/or device identification.

A server system for starting up electric or electronic devices, in particular devices in or for an aircraft or spacecraft, by means of a method according to the invention, comprising: a data interface which is designed to communicate with a plurality of devices; a control means which is designed to retrieve location identifications and device identifications of devices via the data interface and to qualify the retrieved location identifications and device identifications.

A system, in particular for aircraft or spacecraft, comprising at least one server system according to the invention and a plurality of devices.

The findings underlying the present invention are that the manual parameterisation of devices is an error-prone and time-consuming process. The idea underlying the present invention consists in assisting the manual parameterisation of the devices via an automated process. For this purpose, a location identification which corresponds to the FIN is detected electronically. In this context, the location identification is placed, for example, in spatial proximity to the location of the respective device and identifies the location of the respective device. When the location identification is detected, this is transmitted to the device to be started up. The device is then parameterised by means of the location identification.

In particular the steps of transmitting the location identifications to the devices and parameterising the devices can, for example, be carried out by a start-up apparatus according to the invention which is provided specifically for this purpose. In this case, the location identification is transmitted to the devices for example via a radio interface or a data bus interface. This is particularly advantageous if the devices already have an interface of this type for communicating with a server and this interface can be used for transmitting the location identification. Additionally or alternatively, the data can be transmitted by means of an RFID data transmission, an optical data transmission or the like.

When a system according to the invention comprising a plurality of devices is installed, for example in an aircraft or spacecraft, the proper start-up and parameterisation of the individual devices can be checked by a server system according to the invention. For this purpose, the server system retrieves the location identifications of the individual devices and the device identification thereof. The retrieved data are then qualified by the server system. It is thus possible to ensure, in the case of devices arranged in an aircraft, that all devices have been properly installed and started up, even prior to delivery of the aircraft.

By means of the method according to the invention, devices can be started up without mechanical or movable components of the devices having to be used for this purpose. Starting up the plurality of devices is also less prone to error than conventional methods. As a result, repeated start-ups and repairs are avoided and the construction of the aircraft or spacecraft is accelerated. The start-up per se is not only made less error-prone by the method according to the invention, but is also significantly quicker to carry out than with conventional methods. As a result, assembly of the aircraft or spacecraft is accelerated further.

Finally, at least some steps of a start-up according to the invention of devices can be carried out in a very early assembly phase of the aircraft or spacecraft, whereby parallel start-up of different devices in the individual portions of the aircraft or spacecraft is possible. This also allows more rapid assembly of the aircraft or spacecraft.

As a result of the advantages mentioned thus far, it is possible to produce an aircraft or spacecraft in a shorter time and with a lower error rate and to thereby save on production costs.

Advantageous configurations and developments of the invention emerge from the further dependent claims and from the description with reference to the figures of the drawings.

According to a preferred development, for the detection of the location identification, the location identification is read out from a barcode and/or RFID tag and/or detected by means of an optical data transmission interface and/or by means of an optical sensor and an image recognition function. The optical sensor may for example be a camera, a CCD cell or the like. Additionally or alternatively, the location identification is verified. This allows flexible use of the method according to the invention by means of different types of location identification. A location identification may be printed on a sticker, for example as a number or a barcode. In a further embodiment, a location identification can also be stored in an RFID tag. In further embodiments, the location identification can be stored in an electronic display tag which can transmit the location identification via a light interface or an infrared interface. If, after reading in the location identification, the read-in location identification is verified, it is possible to check, for example in a production facility, whether the correct location identification for the desired location is provided. As a result, errors in the placement of the location identifications can also be detected before devices are incorrectly started up.

According to a preferred development, during transmission of the location identification and parameterisation, a start-up apparatus supplies the respective device with electric energy, provided that it does not have its own energy source. This makes it possible to carry out at least some steps of a start-up according to the invention of devices very early during the construction of, for example, an aircraft or spacecraft. In particular, devices can be started up even though, for example, the cable form of the aircraft or spacecraft is not yet installed. It is also possible to parameterise devices which do not have their own energy supply or of which the energy supply, for example a battery, is not yet activated. These may be, for example, passive sensors which are supplied with energy by a server during a data transmission, which server retrieves data from the sensors. The energy can be transmitted by means of electromagnetic waves, as in the case of RFID tags, for example. In a further embodiment, the energy can be transmitted optically by means of visible or invisible light.

According to a preferred development, during transmission of the location identification, an identifier of the aircraft or spacecraft, for example what is known as a Manufacturer Serial Number (MSN), is also transmitted, and/or during parameterisation the respective device is also parameterised by means of the transmitted identifier. As a result, it is possible to construct a plurality of aircraft or spacecraft simultaneously in a single production hall and start up the devices thereof without, for example, a server of an aircraft or spacecraft accidentally communicating with a device of another aircraft or spacecraft via a radio interface.

According to a preferred development, the respective device produces a confirmation signal after parameterisation. As a result, it is possible to ensure that a device has been properly parameterised. Faulty parameterisation or accidental parameterisation of an adjacent device, for example via a radio interface, can thus be ruled out.

According to a preferred development, the detected location identification and a device identification supplied by the corresponding device are displayed via a display apparatus, the display apparatus being designed to retrieve a correction of the displayed location identification and/or the displayed device identification and/or a transmission start signal. In one embodiment, the device identification comprises a part number of a device, which number clearly identifies the type of a device. Additionally or alternatively, the device identification can also have a serial number which clearly identifies the individual device. By means of the part number it is possible to check whether a device corresponds to the detected location identification. The serial number makes it possible also to determine whether the correct device is being communicated with. If, for example, communication takes place via a radio interface, it is thus possible to ensure that an adjacent device is not being communicated with. As a result, the error rate during construction of the aircraft or spacecraft is further reduced.

According to a preferred development, in each case a pair made up of a location identification transmitted to a device and the device identification supplied by the respective device is stored and the stored pairs of location identifications and device identifications are transmitted to at least one central control means. This makes it possible to trace individual devices after installation. If, for example, devices of a batch are affected by an error, these can thus be identified rapidly and their location determined. The devices can thus be replaced rapidly.

According to a preferred development, the transmitted location identification is compared with the device identification supplied by the respective device and a warning message is emitted if the transmitted location identification does not correspond to the device identification supplied by the associated device. In one embodiment, the location identification and/or the device identification also comprise information about the function of the device to be started up. In this case, checking can take place continuously, for example by means of a radio data transmission to a planning computer of a production system, or collectively after completing a construction portion. This allows real-time monitoring of construction progress. The planning computer can check whether the respective location identifications correspond to the device identifications stored therewith and report an error early if, for example, incorrect installation has occurred.

According to a preferred development, location identifications and device identifications of a plurality of devices are retrieved, the retrieved location identifications and device identifications are qualified and normal operation is enabled if there is a positive qualification result for the retrieved location identifications and device identifications. As a result, it is possible to check fault-free start-up of a plurality of devices simultaneously and, depending on this checking, to enable a function. This is advantageous particularly during final assembly and start-up, for example of an aircraft or spacecraft. A server or server system of the aircraft or spacecraft can thus retrieve for example the location identifications and device identifications from all the devices with which it communicates during normal operation. All the location identifications and device identifications can then be qualified simultaneously.

According to a preferred development, for the qualification of the retrieved location identifications and device identifications, the retrieved location identifications and device identifications are output via an output means and a qualification of the displayed location identifications and device identifications of the devices is retrieved and/or the retrieved location identifications and device identifications are transmitted to a central control means and a qualification of the displayed location identifications and device identifications of the devices is retrieved automatically from the central control means. This allows flexible and rapid qualification of the devices which have been started up.

According to a preferred development, for enabling normal operation, in each case a key for encrypting the data transmission involving at least one of the devices is produced, the produced key is transmitted to the respective device and the communication with the respective device is encrypted by means of the respective transmitted key. Communication with a device by means of a key allows secure communication with the respective device. This prevents, for example, a malicious attacker from transmitting falsified data to a server. In further embodiments, a key can also be used to authenticate a device. This ensures that, for example, the server communicates with the correct device.

According to a preferred development, defective devices are detected by means of remote diagnosis and the parameterisation of the detected defective devices is backed up. The parameterisation of the detected defective devices is also deleted in the detected defective devices. Finally, a replacement device for at least one of the detected defective devices is automatically identified and the respective replacement device is parameterised by means of the backed-up parameterisation. If these steps are carried out automatically by a server or server system of the aircraft or spacecraft, a defective device can be replaced and a replacement device automatically parameterised without special maintenance tools being required for this purpose. In one embodiment, a user confirmation, for example of an aircraft technician, can be requested at each individual step. If a plurality of devices is to be replaced at the same time, the individual steps for replacing a device are repeated for each device. Alternatively, it is also possible to remove all the defective devices and start up the replacement devices in the same way as new devices.

The configurations and developments above can be combined in any expedient manner. Further possible configurations, developments and implementations of the invention also include not explicitly mentioned combinations of features of the invention which are described above or below in relation to the embodiments. In particular, a person skilled in the art will also add individual aspects as improvements or supplements to the respective basic form of the present invention.

In one embodiment, a server system according to the invention may comprise, for example, a plurality of means mounted separately in space, which together are designed to perform the function of a server system according to the invention.

BRIEF DESCRIPTION OF THE DRAWINGS

The present invention is described in greater detail below with reference to the embodiments shown in the schematic figures of the drawings, in which.

Figure 1:
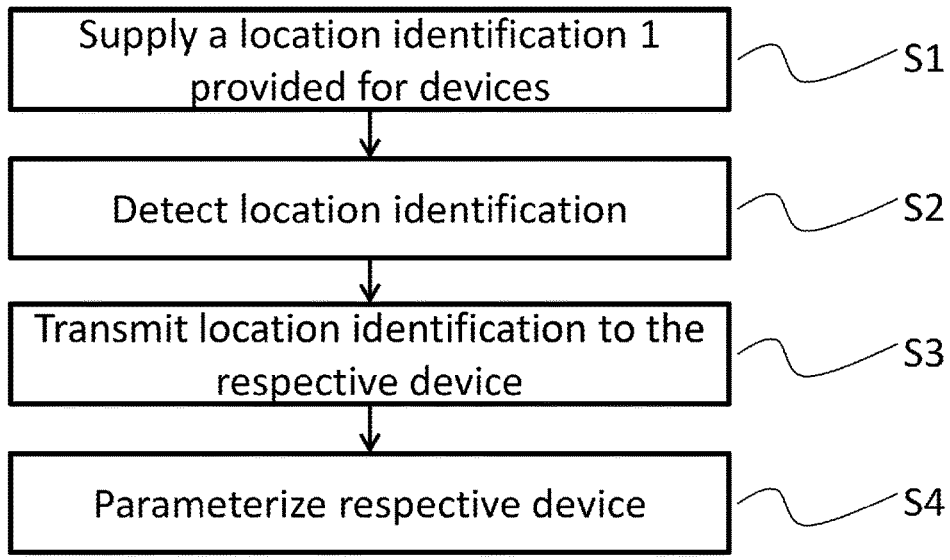
FIG. 1 is a flow chart of an embodiment of a method according to the invention.

The appended drawings are intended to facilitate understanding of the embodiments of the invention. They show embodiments and serve, in connection with the description, to illustrate principles and approaches of the invention. Other embodiments and many of the advantages mentioned emerge from the drawings. The elements of the drawings are not necessarily shown to scale in relation to one another.

In the figures of the drawings, elements, features and components which are like, functionally like or have an equivalent effect are provided with the same reference numerals in each case, unless indicated otherwise.

DETAILED DESCRIPTION OF THE PREFERRED EMBODIMENTS

FIG. 1 is a flow chart of an embodiment of a method according to the invention.

At S1, a location identification 1 provided for devices 20*a*-20*c* is supplied in each case. The supplied location identification 1 contains at least one piece of information about the location of the respective device. For example, the location identification 1 may identify a particular seat in an aircraft and be in the form of a hexadecimally coded number, for example, 1AB1. A location identification 1 can be placed for example on a sticker.

The location identification 1 is detected at S2. In one embodiment, the location identification 1 is detected by a start-up apparatus 2 carried by a technician during production of an aircraft or spacecraft.

When the location identification 1 has been detected, this is transmitted to the respective device 20a-20c at S3. The location identification 1 can be transmitted by means of radio transmission, optical data transmission, cable-based data transmission or the like.

Finally, the respective device 20a-20c is parameterised at S4 by means of the transmitted location identification 1.

The parameterisation of a device 20a-20c differs from the transmission, during operation, of useful data from or to the respective device 20a-20c.

When parameterising a device 20a-20c, parameters which are required for operation of the device are transmitted to the device. These may be, for example, parameters regarding the hardware of the device 20a-20c, the operating environment of the device 20a-20c or the like. A device 20a-20c is therefore not functional without correct parameterisation.

During the parameterisation of a device 20a-20c, parameters which define particular constraints for the operation of the respective device 20a-20c in a corresponding application can be transmitted to the device, for example. Thus, for example, the function of the respective device 20a-20c can also be influenced.

For devices 20a-20c which have a digital bus interface, for example a CAN bus, a FlexiRay interface, an Ethernet interface or the like, the parameters may comprise, for example, the bus parameters which the device 20a-20c requires in order to communicate with the corresponding digital bus. These may include, for example, the clock rate or baud rate or speed of the digital bus, the station address of the respective device 20a-20c on the bus, the station address of other devices on the digital bus and the like. For a device 20a-20c which has an Ethernet interface, it is possible, for example, for an IP address, a subnet mask and a standard gateway to be established. In a further embodiment, it is also possible to establish for this device 20a-20c that the IP address of the device is to be retrieved via DHCP. In one embodiment, the parameters may also comprise an identifier for the respective device 20a-20c, which identifier is used to identify the device in a data network. In another embodiment, the parameters also comprise one or more cryptographic keys which the respective device 20a-20c requires in order to communicate via a data bus.

In one embodiment, the parameters may also comprise information about the device 20a-20c itself. For example, the parameters may supply a control means for the device 20a-20c with information regarding which type and what amount of memory is installed in the device 20a-20c, the rate at which the processor of the device 20a-20c is clocked and which hardware interfaces the device 20a-20c comprises. Further information which can be transmitted as parameters to a device 20a-20c is also possible. For example, in one embodiment the parameters may include information about the fact that the respective device 20a-20c comprises an integrated hard disk memory, and to which terminal this hard disk memory is connected. In a further embodiment, the parameters may comprise the information that the respective device 20a-20c has only an integrated RAM of a predetermined size.

The above-mentioned procedures S1-S4 can be carried out by means of a start-up apparatus 2 according to the invention.

Figure 2:
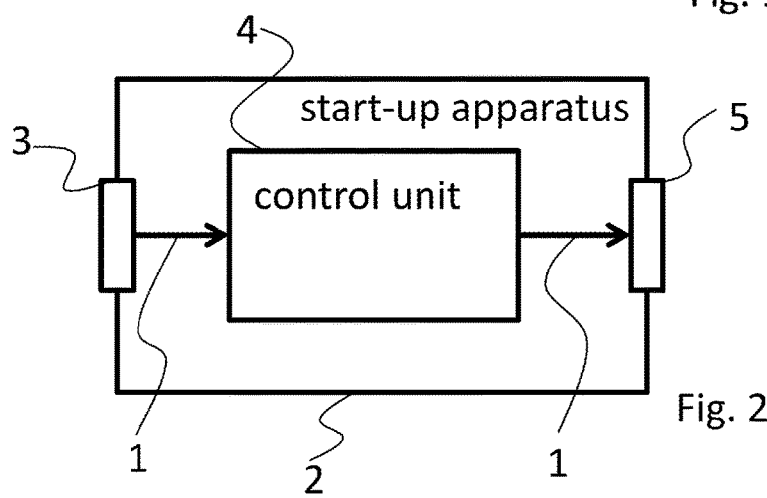
FIG. 2 is a block diagram of an embodiment of a start-up apparatus according to the invention.

FIG. 2 is a block diagram of an embodiment of a start-up apparatus 2 according to the invention. The start-up apparatus 2 comprises a first data interface 3 which is connected to a control unit 4. The control unit 4 is connected to a second data interface 5.

The first data interface 3 is in the form of a barcode scanner. In further embodiments, the first data interface 3 may also be designed as an RFID reader, as a camera having image recognition functions or the like. As a result, it is possible for example to read from a sticker a location identification which is marked as plain text on the sticker.

The control unit 4 of the start-up apparatus 2 is designed as a microcontroller. In further embodiments, the control unit 4 may also be designed as a programmable logic unit, as an application-specific circuit or the like.

Finally, the second data interface 5 of the start-up apparatus 2 is designed as a radio interface. In particular, the second data interface 5 may be designed as a ZigBee interface, for example. In further embodiments, the second data interface 5 may also be designed as an RFID interface. In yet further embodiments, the second data interface 5 may be designed as an optical interface 5 which transmits data by means of visible or invisible light. In yet further embodiments, the second data interface 5 may be designed as a cable-based interface.

Figure 3:
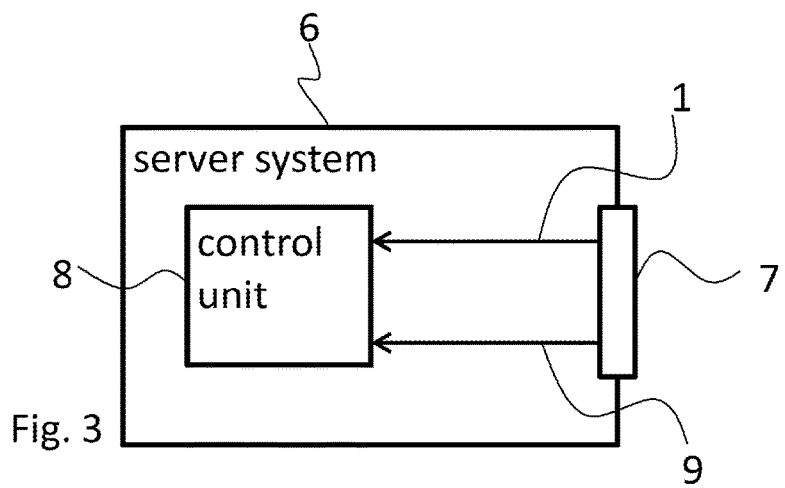
FIG. 3 is a block diagram of an embodiment of a server system according to the invention.

FIG. 3 is a block diagram of an embodiment of a server system 6 according to the invention. The server system 6 has a data interface 7 via which the server system 6 can communicate with devices 20a-20c. In particular, the server system 6 can retrieve, via the data interface 7 which is connected to a control unit 8, location identifications 1 and device identifications 9 of devices 20a-20c.

The server system 6 is designed as a PC which is part of an aircraft on-board network and which has a WLAN interface for communicating with devices 20a-20c. In further embodiments, the server system 6 is designed as an embedded computer. In one embodiment, the data interface 7 may, for example, also be designed as a ZigBee interface, Bluetooth interface or the like. In further embodiments, the server system 6 is designed as a composite of a plurality of means which are coupled together, for example a plurality of PCs, radio interface modules and the like.

Figure 4:
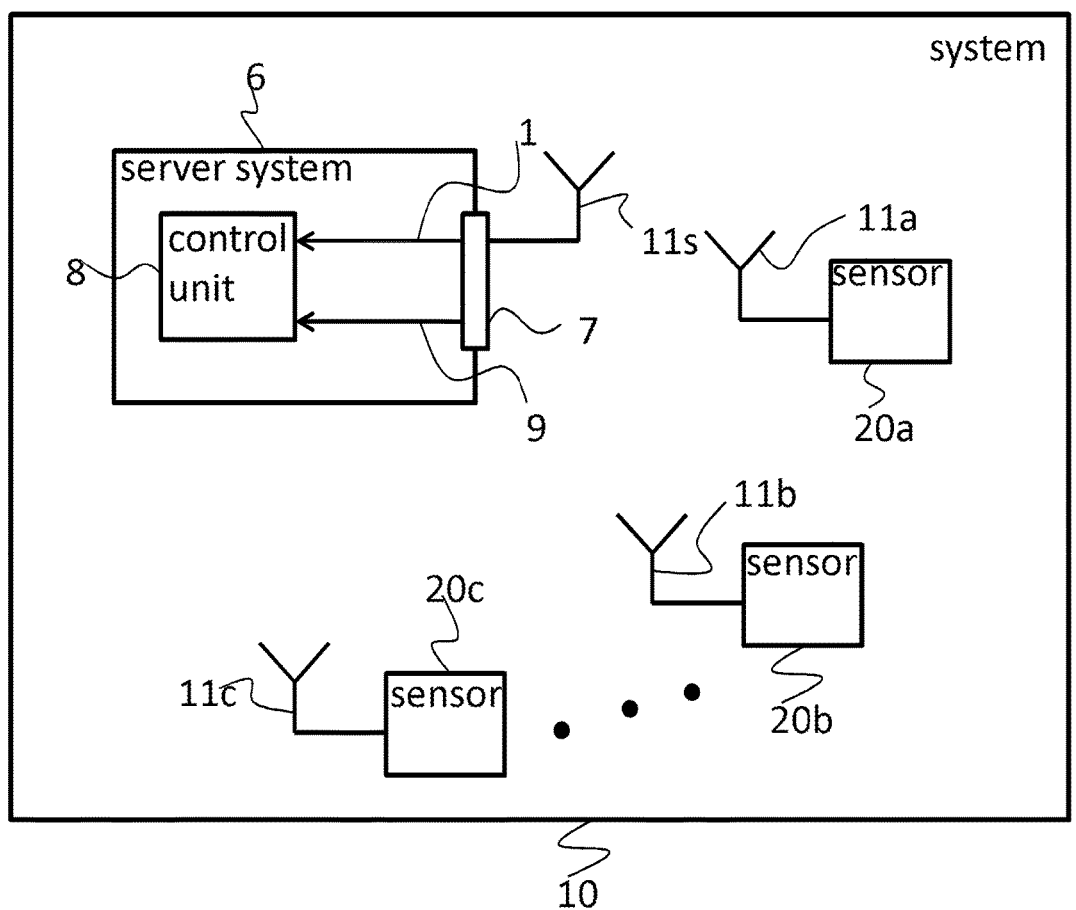
FIG. 4 is a block diagram of an embodiment of a system according to the invention.

FIG. 4 is a block diagram of an embodiment of a system 10 according to the invention. The system comprises a server system 6 according to the invention according to FIG. 3, which server system comprises a radio interface 7 having an antenna 11s. The system 10 further comprises three devices 20a-20c which likewise comprise antennas 11a-11c. Further devices are indicated by three dots between the device 20b and the device 20c.

In the system 10, the server system 6 is a server system 6 of an aircraft for monitoring seat occupancy. For this purpose, the server system communicates with seat occupancy sensors 20a-20c which detect whether or not there is a person on a seat. In further embodiments, the devices 20a-20c are sensors which detect the position of a seat backrest, the position of a seat table or the like. In yet further embodiments, the devices 20a-20c are current sensors which are attached to actuators of an aircraft.

Although the present invention has presently been described on the basis of preferred embodiments, it is not restricted thereto, but can be modified in many different ways.

For example, an embodiment of a method according to the invention can also be used in trains or ships.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for starting up electric or electronic devices in an aircraft or spacecraft, comprising:
supplying at least one location identification which contains at least one piece of information about the location of a respective device;
detecting a supplied location identification for the respective device;
transmitting the detected location identification to the respective device; and
parameterizing the respective device based on the transmitted location identification;
wherein parameterizing comprises transmitting, to the respective device, parameters which are required for operation of the respective device and which define particular constraints for the operation of the respective device in a corresponding application, and
wherein the respective device is not functional without correct parametrization;
wherein in each case a pair made up of a location identification transmitted to a device and a device identification supplied by the respective device is stored and wherein the pairs of stored location identifications and device identifications are transmitted to a central control unit;
wherein the detected location identification and a device identification supplied by a corresponding device are displayed via a display apparatus, the display apparatus being designed to retrieve a correction of at least one of the displayed location identification, the displayed device identification and a transmission start signal; and,
wherein for enabling normal operation, in each case a key for encrypting the data transmission involving at least one of the devices is produced, the produced key is transmitted to the respective device and the communication with the respective device is encrypted based on the respective transmitted key.

2. The method according to claim 1, wherein the step of detecting a supplied location identification comprises at least one of:
the location identification is read out from at least one of a barcode and an RFID tag,
the location identification is detected via an optical data transmission interface,
the location identification is detected via an optical sensor and image recognition functions, and
the location identification is verified.

3. The method according to claim 1, wherein during transmission of the location identification and parameterization, a start-up apparatus supplies the respective device with electric energy, provided that the respective device does not have its own energy source.

4. The method according to claim 1, wherein at least one of:
during transmission of the location identification, an aircraft identifier is also transmitted, and
during parameterization the respective device is also parameterized based on the transmitted aircraft identifier.

5. The method according to claim 1, wherein after the step of parameterization, the parameterized device produces a confirmation signal.

6. The method according to claim 1, wherein the transmitted location identification is compared with the device identification supplied by the respective device and wherein a warning message is emitted if the transmitted location identification does not correspond to the device identification supplied by the associated device.

7. The method according to claim 1, wherein location identifications and device identifications of a plurality of devices are retrieved from the respective devices, and the retrieved location identifications and device identifications are qualified and normal operation is enabled, if there is a positive qualification result for the retrieved location identifications and device identifications.

8. The method according to claim 1, wherein a qualification of retrieved location identifications and device identifications comprises, at least one of:
the retrieved location identifications and device identifications are output via an output means and the qualification of the displayed location identifications and device identifications of the devices is retrieved, and
the retrieved location identifications and device identifications are transmitted to a central control unit and the qualification of the displayed location identifications and device identifications of the devices is retrieved automatically from the central control unit.

9. The method according to claim 1, wherein a defective device is detected by remote diagnosis, the previous parameterization of the detected defective device is stored, the parameterization of the detected defective device is deleted, a replacement device for the detected defective device is automatically identified and the respective replacement device is parameterized based on the stored parameterization.

10. A start-up apparatus for electric or electronic devices in an aircraft or spacecraft for carrying out a method according to claim 1, the apparatus comprising:
a first data interface which is designed to read in at least one of a location identification and a device identification of a device;
a second data interface which is designed to communicate with at least one device; and
a control unit which is designed to parameterize a device via the second data interface based on the at least one read-in location identification and read-in device identification;
wherein parameterizing comprises transmitting, to the respective device, parameters which are required for operation of the respective device and which define particular constraints for the operation of the respective device in a corresponding application, and
wherein the respective device is not functional without correct parametrization;
wherein in each case a pair made up of a location identification transmitted to a device and a device identification supplied by the respective device is stored and wherein the pairs of stored location identifications and device identifications are transmitted to a central control unit;
wherein the detected location identification and a device identification supplied by a corresponding device are displayed via a display apparatus, the display apparatus being designed to retrieve a correction of at least one of the displayed location identification, the displayed device identification and a transmission start signal; and, wherein for enabling normal operation, in each case a key for encrypting the data transmission involving at least one of the devices is produced, the produced key is transmitted to the respective device and the communication with the respective device is encrypted based on the respective transmitted key.

11. A system comprising a plurality of devices to be parameterized in an aircraft or spacecraft and at least one server system for starting up the devices to be parameterized, the server system comprising:

a data interface which is designed to communicate with a plurality of devices; and a control unit which is designed to retrieve location identifications and device identifications of devices via the data interface and to qualify the retrieved location identifications and device identifications;

wherein parameterizing comprises transmitting, to the respective device, parameters which are required for operation of the respective device and which define particular constraints for the operation of the respective device in a corresponding application, and wherein the respective device is not functional without correct parametrization;

wherein in each case a pair made up of a location identification transmitted to a device and a device identification supplied by the respective device is stored and wherein the pairs of stored location identifications and device identifications are transmitted to a central control unit;

wherein the detected location identification and a device identification supplied by a corresponding device are displayed via a display apparatus, the display apparatus being designed to retrieve a correction of at least one of the displayed location identification, the displayed device identification and a transmission start signal; and, wherein for enabling normal operation, in each case a key for encrypting the data transmission involving at least one of the devices is produced, the produced key is transmitted to the respective device and the communication with the respective device is encrypted based on the respective transmitted key.

12. A method for starting up sensors in an aircraft or spacecraft, comprising:

supplying at least one location identification which contains at least one piece of information about the location of a respective sensor;

detecting a supplied location identification for the respective sensor;

transmitting the detected location identification to the respective sensor; and parameterizing the respective sensor based on the transmitted location identification;

wherein parameterizing comprises transmitting, to the respective sensor, parameters which are required for operation of the respective sensor and which define particular constraints for the operation of the respective sensor in a corresponding application, and wherein the respective device is not functional without correct parametrization;

wherein in each case a pair made up of a location identification transmitted to a device and a device identification supplied by the respective device is stored and wherein the pairs of stored location identifications and device identifications are transmitted to a central control unit;

wherein the detected location identification and a device identification supplied by a corresponding device are displayed via a display apparatus, the display apparatus being designed to retrieve a correction of at least one of the displayed location identification, the displayed device identification and a transmission start signal; and, wherein for enabling normal operation, in each case a key for encrypting the data transmission involving at least one of the devices is produced, the produced key is transmitted to the respective device and the communication with the respective device is encrypted based on the respective transmitted key.

* * * * *